United States Patent

Heckman et al.

Patent Number: 5,307,981
Date of Patent: May 3, 1994

[54] METHOD AND APPARATUS FOR OPTIMIZING BOND TOOL PRESSURE DISTRIBUTION

[75] Inventors: James K. Heckman, Tempe; Mark C. Hoggatt, Mesa, both of Ariz.

[73] Assignee: Motorola, Inc., Schaumburg, Ill.

[21] Appl. No.: 993,985

[22] Filed: Dec. 21, 1992

[51] Int. Cl.$^5$ .............................. B23K 1/00; B23K 3/00
[52] U.S. Cl. ............................. 228/102; 228/106; 228/5.5; 228/9
[58] Field of Search ............ 228/102, 103, 106, 180.02, 228/5.5, 8, 9

[56] References Cited

U.S. PATENT DOCUMENTS 4,657,170  4/1987  Muller .
4,934,671  6/1990  Laninga et al. .
5,127,573  7/1992  Chang et al. ..................... 228/180.2
5,150,827  9/1992  Fries .................................. 228/180.2

*Primary Examiner*—Samuel M. Heinrich
*Attorney, Agent, or Firm*—Miriam Jackson

[57] ABSTRACT

Bond tool pressure distribution is optimized by a method and apparatus having a device having a first surface which permits inclination of the first surface in at least one direction, wherein the device is in a locked position. A first bonding arrangement is positioned on the first surface of the device. A second surface makes contact to the first bonding arrangement. This contact is detected and the device is unlocked to allow the first surface to incline while the second surface is in contact with the first bonding arrangement. The second surface is applied to the first bonding arrangement with a force, and the device is locked upon application of the force.

13 Claims, 3 Drawing Sheets

METHOD AND APPARATUS FOR OPTIMIZING BOND TOOL PRESSURE DISTRIBUTION

BACKGROUND OF THE INVENTION

This invention relates, in general, to a method of bonding leads to an integrated circuit, including, but not limited to, a method of optimizing bond tool pressure distribution.

During the manufacture and assembly of components it is often necessary to position or hold a work piece in a co-planar orientation to each other. This is a major concern in the assembly of integrated circuits. In particular, it is desirable to have the integrated circuit co-planar with a bonding tool when inner lead bonding (ILB) is performed in a tape automated bonding (TAB) process. When the IC and the bonding tool are coplanar, a uniform amount of pressure is applied to all the leads and the IC, which results in more uniform bonding of the leads to the IC. More uniform bonding translates into a more reliable IC having a reduced amount of lead lifts.

In the past, a self aligning air bearing platform has been used, such as that described by Laninga et al in U.S. Pat. No. 4,934,671 on Jun. 19, 1990. The self aligning air bearing described in this patent has significantly improved the state of the art in this area, but it would be desirable to further optimize the process of achieving coplanarity between the IC and the bonding tool beyond that which was realized by Laninga et al.

SUMMARY OF THE INVENTION

The present invention provides for a method of optimizing a bond tool pressure distribution, comprising the steps of providing a device having a first surface which permits inclination of the first surface in at least one direction, wherein the device is in a locked position. A first bonding arrangement is positioned on the first surface of the device. A second surface contacts the first bonding arrangement. The device is then unlocked to allow the first surface to incline while the second surface is in contact with the first bonding arrangement. The second surface is applied to the first bonding arrangement with a force, the device is locked upon application of the force.

The method of the present invention is preferably carried out by an apparatus, comprising a device having a first surface which permits inclination of the first surface in at least one direction and a second surface capable of contacting a first bonding arrangement positioned on the first surface of the device. A means for determining when the second surface makes contact with the first bonding arrangement is coupled to the device. A means for locking and unlocking the first surface is coupled to the device and cooperates with the means for determining when the second surface makes contact with the first bonding arrangement.

DETAILED DESCRIPTION OF THE DRAWINGS

Figure 1:
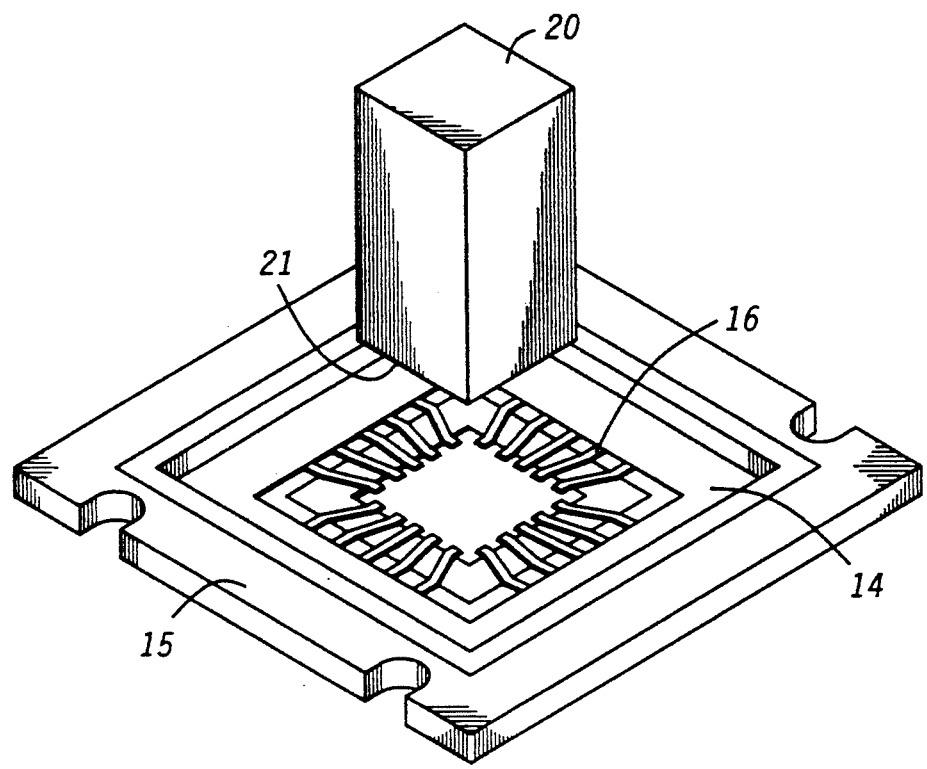
FIG. 1 illustrates an application for the present invention.
Figure 1:
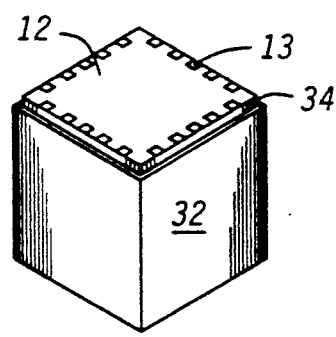

FIG. 1 illustrates an embodiment of an application for the present invention. What is shown is a portion of a TAB system and a bonding arrangement 10 comprised of a work piece 15, in this embodiment, a thin film tape carrier frame 15, and a semiconductor device or integrated circuit (IC) 12. Carrier frame 15 holds a thin film tape 14. Tape 14 contains a plurality of leads 16 which are bonded to a plurality of contact areas 13 on IC 12. IC 12 is mounted on a first surface 34 of a platform 32, which, in a preferred embodiment, also serves as a heater block.

Bonding tool 20 is used to apply a force to bond the leads 16 of tape 14 to contact areas 13 of IC 12. Bonding tool 20 is shown in a very simplified form, but is actually more complex than is shown. A simplified illustration is shown because there are many variations of bonding tool 20, which is typically referred to as a thermode. An important feature of bonding tool 20 is that it have a flat bottom surface 21.

In order to optimize the bonding of leads 16 on tape 14 to contact areas 13 on IC 12, it is desirable to have the bottom surface 21 of bonding tool 20 be substantially coplanar or parallel with leads 16 on tape 14, with IC 12, and with first surface 34 of platform 32. If this coplanarity is not present, the bonding pressure will not be equal on all leads 16 of tape 14. This would result in nonuniform bonding of the leads 16 to IC 12. Nonuniform bonding of leads 16 means that some of the leads 16 may not be adequately bonded to IC 12, resulting in lead lifts.

The present invention provides a method and apparatus for optimizing the coplanarity of the system in order to obtain more uniform bonding. Uniform bonding is important because variations of as little as microns can result in a finished IC 12 having inconsistent bond strengths, and in particular, lead lifts.

Figure 2:
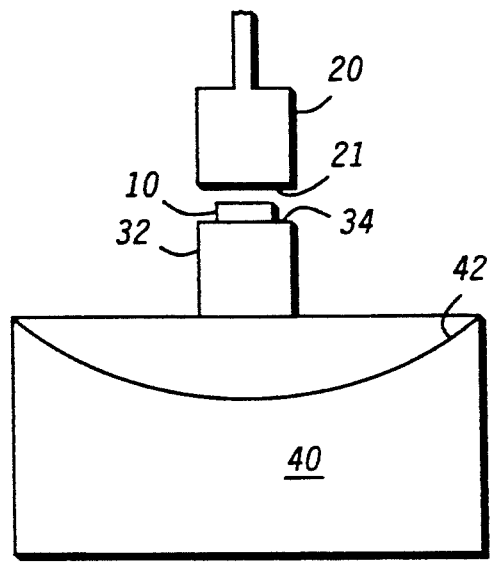
FIG. 2 illustrates the application shown in FIG. 1 utilizing the method of the present invention in a beginning step.

FIG. 2 illustrates the application shown in FIG. 1 utilizing the method of the present invention in a beginning step. A portion of bonding arrangement 10 is positioned on first surface 34 of platform 32 (Bonding arrangement 10 is shown as one piece in FIGS. 2-4 to simplify the drawings). Platform 32 is coupled to a gimbal 40. Gimbal 40 is a device which permits a body to incline freely in at least one direction. Gimbal 40 can be comprised of a self-aligning air bearing disclosed in U.S. Pat. No. 4,934,671, issued to Laninga et al on Jun. 19, 1990, which allows for inclination in two directions and which is hereby incorporated by reference. However, a device which allows for inclination in any direction may also be used. If the self-aligning air bearing of Laninga et al is used, the advantages of that invention will be realized in addition to the advantages of the present invention. In the embodiment shown in FIG. 2, gimbal 40 is shown to have an air bearing 42, which allows first surface 34 to incline or float when air pressure is provided in air bearing 42 or to be locked in a position when a vacuum is used in air bearing 42.

In the past, gimbal 40 could be provided in either the locked or float mode by toggling a manually operated switch. If gimbal 40 is left only in the float mode, it tends to drift, resulting in bonding arrangement 10 not being coplanar at the time bonding tool 20 makes initial contact to bonding arrangement 10. If bonding arrangement 10 is not coplanar with bonding tool 20 at initial impact, the subsequent force applied by bonding tool 20 may never be equalized across bonding arrangement 10. If gimbal 40 is left only in the locked mode, variations from one bonding arrangement 10 to another will not be accounted for and will result in an unequalized amount of pressure distribution on bonding arrangement 10 from bonding tool 20. In the worst case, bonding tool 20 may never make contact with a portion of bonding arrangement 10. In addition, a manually operated switch is not well suited for a manufacturing process.

The present invention provides a method and apparatus for optimizing the coplanarity of bonding tool 20, bonding arrangement 10 and platform 32 in order to obtain product having consistent bond strength. This is provided by providing gimbal 40 in a locked position as shown in FIG. 2. Preferably, this locked position is determined by a previously coplanar bonding arrangement substantially similar to bonding arrangement 10 to be bonded or by an initial setup routine. Bonding tool 20 then descends toward bonding arrangement 10.

Figure 3:
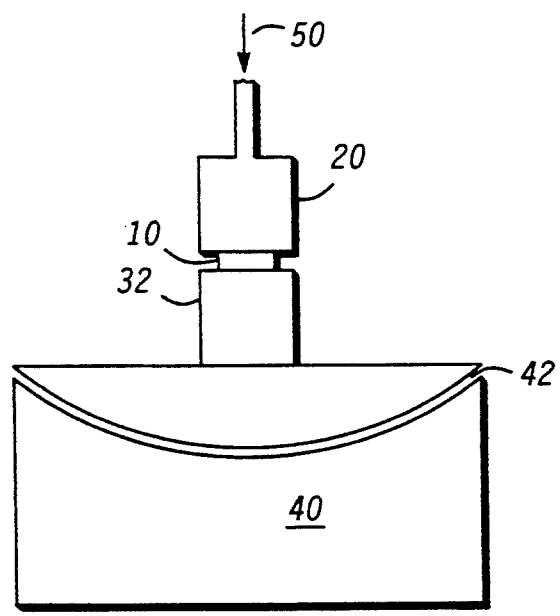
FIG. 3 illustrates the application shown in FIG. 1 utilizing the method of the present invention in a further step.

FIG. 3 illustrates the structure of FIG. 2 in a further step. Bonding tool 20 is lowered in the direction of arrow 50 to make contact to bonding arrangement 10. Upon initial contact of bonding tool 20 to bonding arrangement 10, gimbal 40 switches to the float mode, which allows inclination of first surface 34 of platform 32. Because bonding tool 20 is contacting bonding arrangement 10, only a movement to allow pressure equalization is allowed. This equalization continues as more force is applied to bonding arrangement 10 by bonding tool 20.

Figure 4:
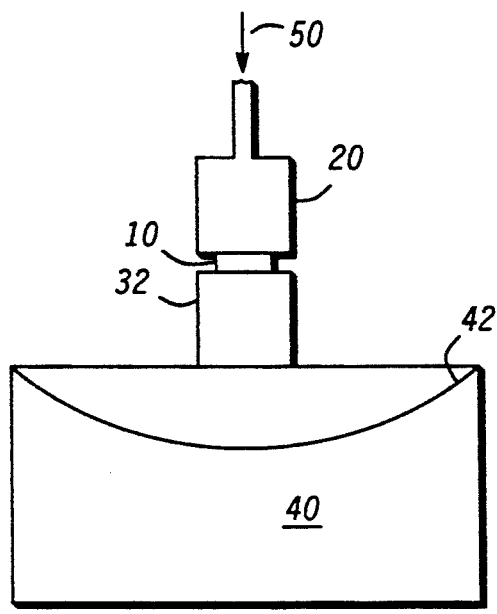
FIG. 4 illustrates the application shown in FIG. 1 utilizing the method of the present invention in a further step.

FIG. 4 illustrates the structure of FIG. 3 in a further step. In a preferred embodiment, gimbal 40 is locked when the bonding force reaches a setpoint or maximum bonding force. However, gimbal 40 may be locked prior to the application of maximum force, but somewhere in between initial contact and maximum force. It is preferable to lock gimbal 40 when maximum force is reached because coplanarity of bonding arrangement 10 and bonding tool 20 is optimized at this point.

Once the bonding process is complete, bonding tool 20 is raised or withdrawn from bonding arrangement 10, as shown in FIG. 2, and bonding arrangement 10 is removed from platform 32 and another bonding arrangement 10 is positioned on platform 32. Bonding of the second bonding arrangement 10 is then performed in the same manner at described with respect to FIGS. 2-4. In the case of the second and any subsequent bonding arrangements 10 to be bonded, gimbal 40 is provided in a locked position which was determined to be coplanar with the previous, substantially similar bonding arrangement 10. In this way, gimbal 40 is not allowed to float to an arbitrary level, which is not as optimum as the locked position of gimbal 40 in bonding the preceding bonding arrangement 10.

Figure 5:
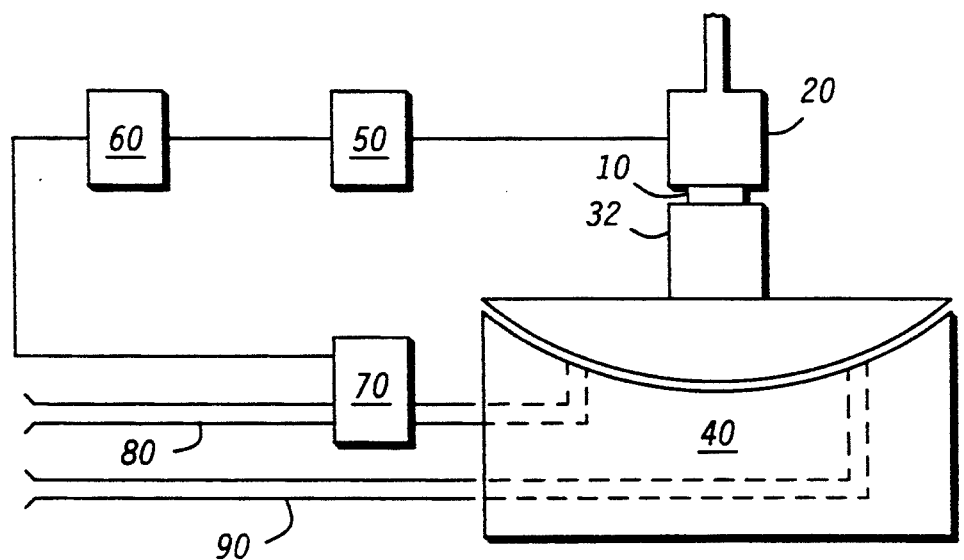
FIG. 5 illustrates a functional diagram of an embodiment of the present invention.

FIG. 5 illustrates a functional diagram of an embodiment of the present invention. A means for detecting 50 when bonding tool 20 initially contacts bonding arrangement 10 is coupled to a control circuit 60 which is coupled to a means for locking and unlocking 70 gimbal 40, which is coupled to gimbal 40. The means for detecting 50 when bonding tool 20 initially contacts bonding arrangement 10 may be comprised of a device which can detect contact automatically, such as a circuit, a laser or a micrometer. Means for detecting 50 is coupled to bonding tool 20 or may be a force sensing structure built directly into bonding tool 20. If means for detecting is comprised of a circuit, then it is preferably comprised of an edge triggered variable interval timer. Means for detecting 50 sends a signal to control circuit 60, which processes it and sends a signal to means for locking and unlocking 70. In a preferred embodiment, means for locking and unlocking 70 is coupled to a means for providing an inert gas 80, and is, in a preferred embodiment, comprised of a valve which switches inert gas 80 on/off. Means for locking and unlocking 70 could be coupled to a means for providing a vacuum 90. However, it is easier to control the regulation of a flow of a gas, and therefore coupling to means for providing an inert gas 80 provides for more optimization of obtaining coplanarity of the system.

We claim:

1. A method of optimizing a bond tool pressure distribution, comprising the steps of:
   providing a device having a first surface which permits inclination of the first surface in at least one direction, wherein the device is in a locked position;
   providing a first bonding arrangement having at least a portion positioned on the first surface of the device;
   providing a second surface and contacting the second surface to the first bonding arrangement;
   unlocking the device to allow the first surface to incline upon contact of the second surface to the first bonding arrangement;
   applying the second surface to the first bonding arrangement with a bonding force; and
   locking the device upon application of the bonding force.

2. The method of claim 1 wherein the step of providing the device in a locked position comprises providing the device in a locked position which was previously determined to be coplanar with another bonding arrangement substantially similar to the first bonding arrangement.

3. The method of claim 1 further comprising the steps of:
   removing the second surface from the first bonding arrangement;
   removing the first bonding arrangement from the first surface of the device;
   providing a second bonding arrangement having at least a portion positioned on the first surface of the device;
   contacting the second surface to the second bonding arrangement;
   unlocking the device to allow the first surface to move and evenly distribute a pressure of the second surface on the second bonding arrangement to optimize coplanarity of the second bonding arrangement and the second surface;
   applying the second surface to the second bonding arrangement with a force; and
   locking the device upon application of the force.

4. The method of claim 1 wherein the step of unlocking the device comprises turning a flow of an inert gas coupled to the device on.

5. The method of claim 1 wherein the step of contacting the second surface to the first bonding arrangement further comprises detecting the contact of the second surface to the first bonding arrangement and sending a signal to unlock the device.

6. A method of optimizing a bonding tool pressure distribution, comprising the steps of:
providing a gimbal having a first surface in a locked position;
providing a first bonding arrangement having at least a portion positioned on the first surface of the gimbal;
providing a bonding tool and contacting the bonding tool to the first bonding arrangement;
automatically detecting an initial contact of the bonding tool to the first bonding arrangement;
unlocking the gimbal to allow the first surface of the gimbal to incline upon the initial contact of the bonding tool to the first bonding arrangement;
applying the bonding tool to the first bonding arrangement with a maximum force; and
locking the gimbal when the maximum force is applied.

7. The method of claim 6 wherein the step of providing the gimbal in a locked position comprises providing the gimbal in a locked position which was previously determined to be coplanar with another bonding arrangement substantially similar to the first bonding arrangement.

8. The method of claim 6 further comprising the steps of:
removing the bonding tool from the first bonding arrangement;
removing the first bonding arrangement from the first surface of the gimbal;
providing a second bonding arrangement having at least a portion positioned on the first surface of the gimbal;
contacting the bonding tool to the second bonding arrangement;
automatically detecting an initial contact of the bonding tool to the second bonding arrangement;
unlocking the gimbal to allow the first surface to move and evenly distribute a pressure of the bonding tool on the second bonding arrangement upon the initial contact to optimize coplanarity of the second bonding arrangement and the bonding tool;
applying the bonding tool to the second bonding arrangement with a maximum force; and
locking the gimbal when the maximum force is applied.

9. The method of claim 6 wherein the step of unlocking the gimbal comprises turning a flow of an inert gas coupled to the gimbal on.

10. The method of claim 6 wherein the step of automatically detecting the initial contact further comprises sending a signal to unlock the gimbal.

11. An apparatus, comprising:
a device having a first surface which permits inclination of the first surface in at least one direction;
a second surface capable of contacting a first bonding arrangement positioned on the first surface of the device;
a means for determining when the second surface makes contact with the first bonding arrangement coupled to the device, wherein the means for determining when the second surface makes contact with the first bonding arrangement is comprised of a circuit; and
a means for locking and unlocking the first surface coupled to the device which cooperates with the means for determining when the second surface makes contact with the first bonding arrangement.

12. An apparatus, comprising:
a device having a first surface which permits inclination of the first surface in at least one direction;
a second surface capable of contacting a first bonding arrangement positioned on the first surface of the device;
a means for determining when the second surface makes contact with the first bonding arrangement coupled to the device, wherein the means for determining when the second surface makes contact with the first bonding arrangement is comprised of a laser; and
a means for locking and unlocking the first surface coupled to the device which cooperates with the means for determining when the second surface makes contact with the first bonding arrangement.

13. An apparatus, comprising:
a device having a first surface which permits inclination of the first surface in at least one direction;
a second surface capable of contacting a first bonding arrangement positioned on the first surface of the device;
a means for determining when the second surface makes contact with the first bonding arrangement coupled to the device, wherein the means for determining when the second surface makes contact with the first bonding arrangement is comprised of a micrometer; and
a means for locking and unlocking the first surface coupled to the device which cooperates with the means for determining when the second surface makes contact with the first bonding arrangement.

* * * * *